United States Patent [19]

Herzog et al.

[11] Patent Number: 4,840,475

[45] Date of Patent: Jun. 20, 1989

[54] EXTERNAL MIRROR FOR VEHICLES

[75] Inventors: Siegfried Herzog, Steinenbronn; Dieter Eckert, Magstadt; Max Bausch, Sindelfingen, all of Fed. Rep. of Germany

[73] Assignee: Daimler-Benz Aktiengesellschaft, Stuttgart, Fed. Rep. of Germany

[21] Appl. No.: 38,137

[22] Filed: Apr. 14, 1987

[30] Foreign Application Priority Data

Apr. 24, 1986 [DE] Fed. Rep. of Germany ....... 3613878

[51] Int. Cl.⁴ .......................... B60R 1/06; G02B 5/08; G02B 7/18
[52] U.S. Cl. ................................. 350/604; 248/475.1; 248/900; 248/486; 248/479
[58] Field of Search ............... 350/604, 632, 601, 635, 350/606; 248/900, 549, 475.1, 486, 479

[56] References Cited

FOREIGN PATENT DOCUMENTS

| | | |
|---|---|---|
| 2232897 | 4/1977 | Fed. Rep. of Germany . |
| 2916686 | 2/1981 | Fed. Rep. of Germany . |
| 59535 | 4/1984 | Japan ..................................... 350/606 |
| 50047 | 3/1985 | Japan ..................................... 350/632 |
| 116539 | 6/1985 | Japan ..................................... 350/604 |
| 146741 | 8/1985 | Japan ..................................... 350/632 |
| 146742 | 8/1985 | Japan ..................................... 350/632 |
| 215445 | 10/1985 | Japan ..................................... 350/632 |
| 261744 | 12/1985 | Japan ..................................... 350/632 |
| 1551 | 1/1986 | Japan ..................................... 350/632 |
| 71244 | 4/1986 | Japan ..................................... 350/632 |

*Primary Examiner*—Jon W. Henry
*Attorney, Agent, or Firm*—Barnes & Thornburg

[57] ABSTRACT

The invention concerns an external mirror for vehicles, having a mirror casing, in which a mirror glass is held so as to be adjustable, the mirror casing being held stationary, in the operating position, on a mirror base. In the event of a collision, the mirror casing can pivot away, either to the front or to the rear, about two approximately vertical axes located one behind the other in the direction of travel. In the case of a rigid streamlined fairing for both the mirror casing and the mirror base, there are certain problems in pivoting the fairing parts forward so as to avoid contact. To deal with this, the invention proposes a guide part which is rigidly located relative to the mirror casing and which interacts with a guide track in the mirror base. The guide track is so designed that when the mirror casing executes a pivoting motion in the forward direction, the mirror casing first lifts off from the mirror base. After a certain lifting motion, the guide track is concentric to the current position of the front hinge pin so that further pivoting takes place in a raised position of the mirror casing in which the two fairing parts can pivot past one another without contact and over a large pivoting range.

20 Claims, 4 Drawing Sheets

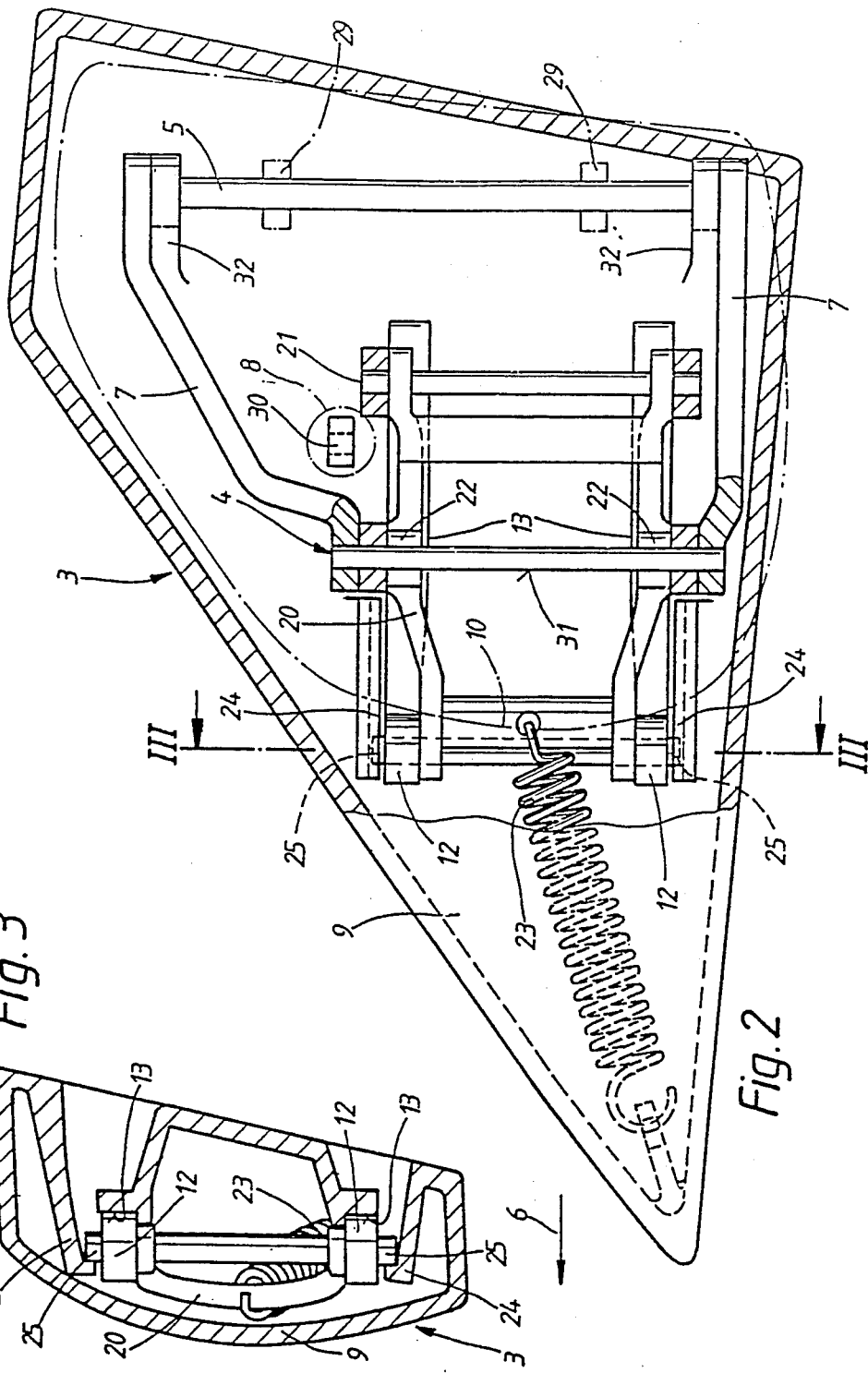

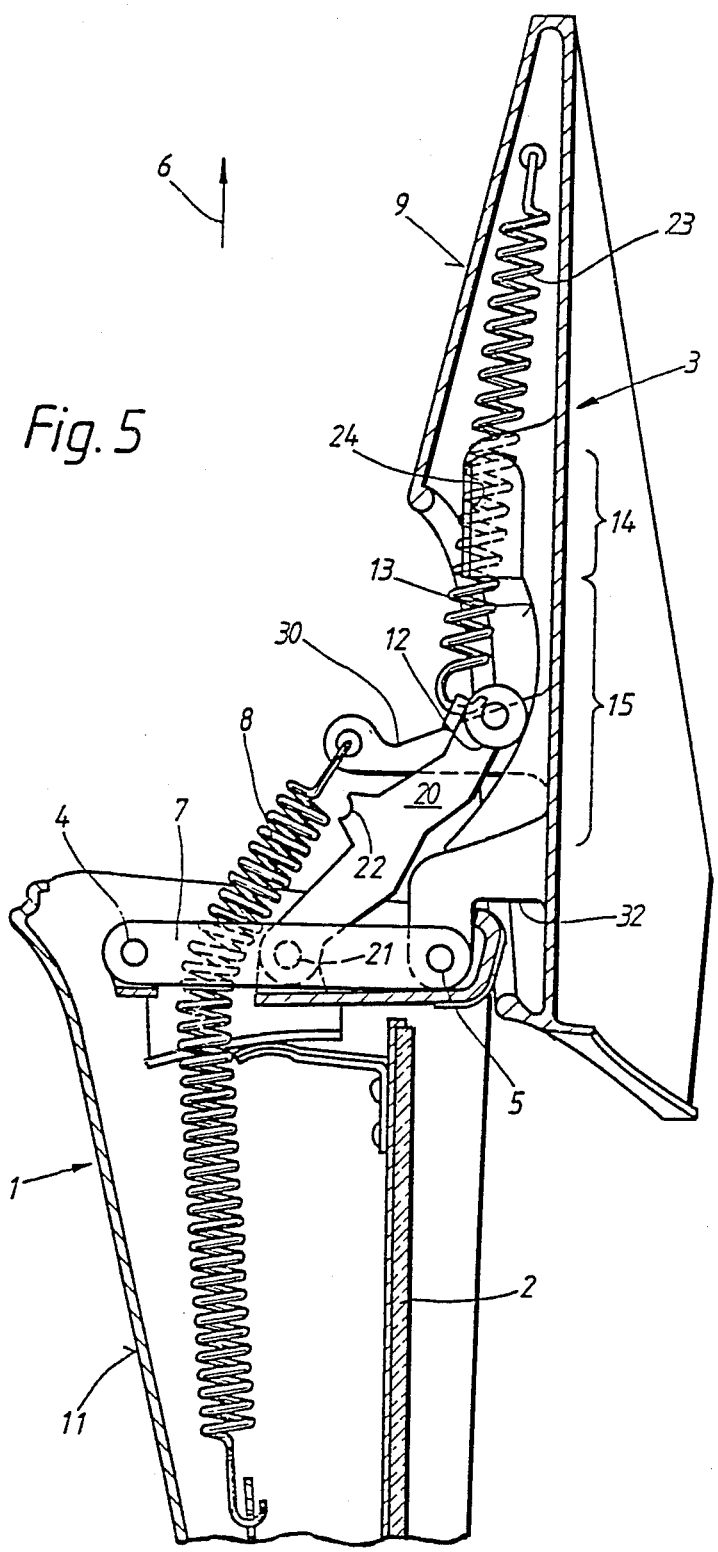

EXTERNAL MIRROR FOR VEHICLES

BACKGROUND AND SUMMARY OF THE INVENTION

The invention concerns an external mirror arrangement for vehicles of the type as is known, for example from West German Pat. (DE-PS) No. 22 32 897. This mirror arrangement includes a mirror casing for housing an adjustable mirror and a mirror base connecting the mirror casing to the vehicle body via a connection linkage that permits pivotal movement of the mirror casing with respect to the base about hinge pivot joints so as to accommodate collision forces on the casing.

In the known mirror, the two hinge pins are parallel to one another; the mirror casing can deflect to the front or to the rear in the case of a collision in the manner of a swinging door. The front hinge pin (in the direction of travel) is immovably associated with the mirror base whereas the rear hinge pin is immovably associated with the mirror casing and can lift off from the mirror base. The mirror base itself is made very small and disappears from view in the operating position of the mirror casing; at least, it is not provided with a streamlined fairing. A disadvantage of this arrangement is that the linkage of the mirror retention is exposed, without protection, to the access of dirt. Experience, however, shows that the external mirrors of passenger cars are located in a region where much dirt arrives in the case of rain because the water wiped off the windshield by the windshield wipers escapes sideways into the vicinity of the mirror base of the external mirror. Protection for the mirror base is therefore important for both aesthetic and functional reasons.

German Published Examined Application (DE-AS) No. 29 16 686 shows a further developed form of an external mirror which can deflect to the front and to the rear about two different hinge pins. In this mirror, the two hinge pins are not parallel but are located at an acute angle to one another so that they intersect at a common point, still within the mirror base. In this mirror, the front pin is associated with the mirror casing so as to be relatively immovable and the rear pin is associated with the mirror base so as to be stationary, the arrangement being, however, more or less a matter of chance. The mirror base and the pin-jointed retention of the mirror casing are provided with a streamlined fairing which, however, because of the pivoting nature of the mirror casing, is manufactured from a rubber-elastic material. In order to achieve a particularly smooth contact between the mirror casing and the vehicle, the elastic fairing is even pulled into the region of the mirror casing; it there has contact, by means of a fine lip, with a correspondingly formed abutment of the rigid fairing of the mirror casing.

A disadvantage of this last mentioned external mirror is that the rubber-elastic fairing cannot be manufactured to the desired accuracy at an acceptable manufacturing cost; the result is that the rubber-elastic fairing does not always make neat contact with the fairing of the rigid mirror casing at the transition point. Another disadvantage of the rubber-elastic fairing is that it cannot be painted to the quality required in the automobile industry. An enduring and hard paint on the elastic substrate would crack severely in the case of a large deformation of the latter and would tend to peel off; a sufficiently elastic paint is not resistant to abrasion and polishing so that it would rapidly acquire a dull and ugly appearance.

An object of the invention is to arrange the moving mirror support in such a way that both the mirror base and the mirror casing can be provided with a rigid streamline fairing but in such a way that deflection of the mirror casing to the front or rear is possible without difficulty in the event of collision.

This object is achieved according to the invention by providing guide structure that assures lifting off of the casing from the base during initial forward movement of the casing. Because of the arrangement of the invention with the instantaneous center of the pivoting motion located outside the streamlined fairings in the vicinity of the gap, the two rigid fairing parts are lifted apart in the critical and initial phase of the forward pivoting motion in such a way that they can move past one another without contact. No corresponding lifting is necessary in the case of the deflecting pivoting motion to the rear so that the flap mechanism can be designed in a conventional manner for this pivoting direction. In especially preferred embodiments a guide link is attached at one end to the casing and carriers a guide roller at the other end which engages a guide track of the base. The location of the effective pivot center can thereby be simply and accurately controlled.

Other objects, advantages and novel features of the present invention will become apparent from the following detailed description of the invention when considered in conjunction with the accompanying drawings.

BRIEF DESCRIPTION OF THE DRAWINGS

FIG. 2 is a sectional view of the arrangement of FIG. 1, taken parallel to the hinge pins through the hinge mechanism viewed towards the mirror base;

FIG. 3 is a sectional view through the mirror base along the section line III—III of FIG. 1;

FIG. 5 is a further horizontal sectional view through the external mirror arrangement of FIG. 1 with the mirror casing folded to the rear.

DETAILED DESCRIPTION OF THE DRAWINGS

Figure 1:
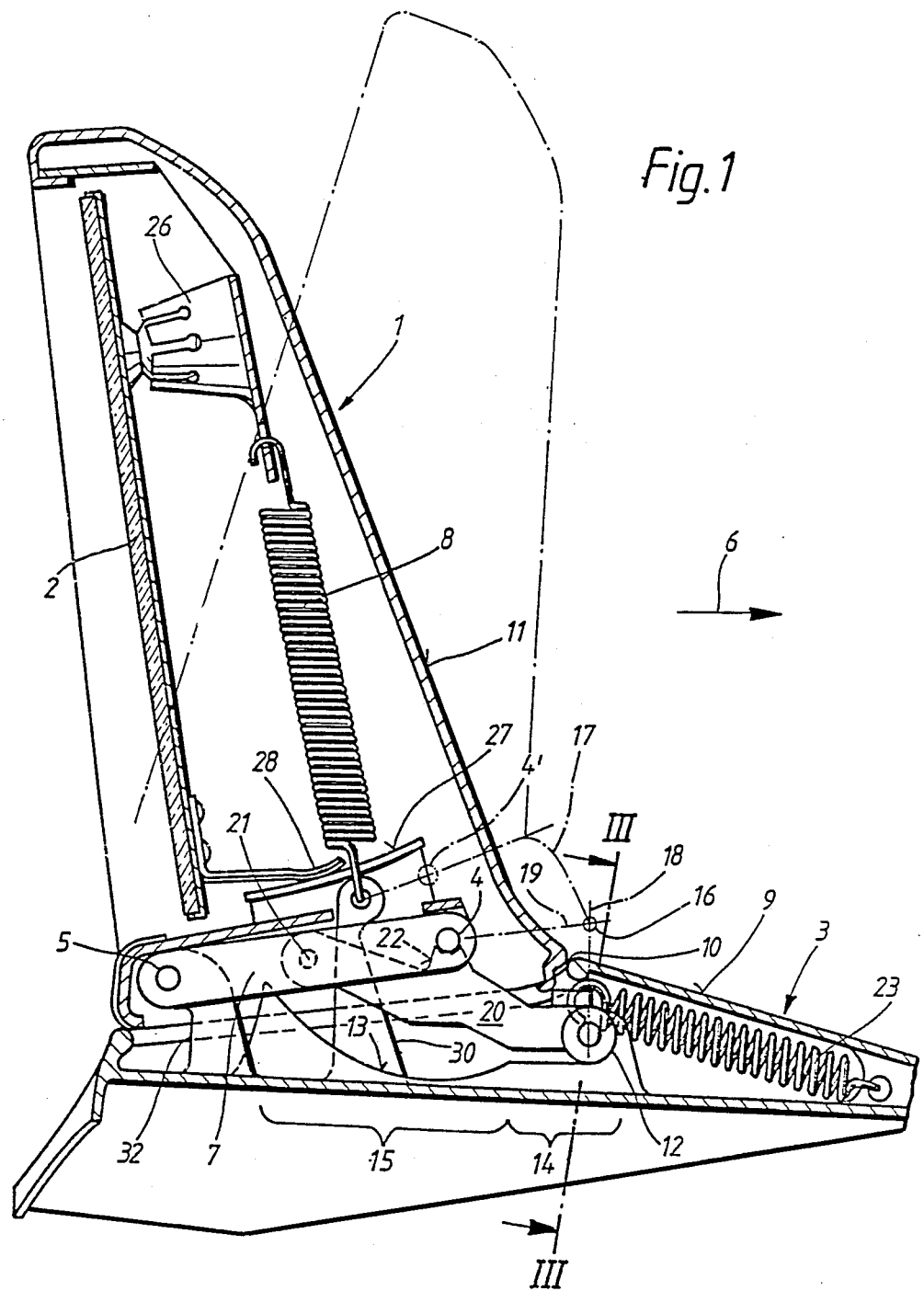
FIG. 1 is a partial schematic part-sectional plan view of an isolated external mirror arrangement in the operating position of the mirror casing relative to the mirror base, constructed in accordance with a preferred embodiment of the invention.

The external mirror shown in the figures includes a mirror casing 1 in which a mirror glass 2 can be adjustably restrained. In the operating position, shown in full lines in FIG. 1, the mirror casing 1 is held immovably on a mirror base 3 and hence on the vehicle body. The mirror glass 2, in the particularly simple embodiment example chosen, is manually adjustable by means of a spherical joint 26, a friction surface 27 concentric with joint 25 in the region of the other end of the mirror glass, and a friction spring 28 fastened to the mirror glass and acting jointly with the friction surface 27 to retain the adjusted position.

The mirror casing 1 is provided with a streamlined fairing 11 of inflexible material. The mirror base 3 holding the mirror casing 1 is rigidly screwed to the outer surface of the associated motor vehicle which is not, howeve, shown in any more detail. Despite the fact that the mirror casing 1 is basically immovable in the operating position, it can fold to the front and to the rear in the event of a collision. A rear hinge pin 5 extending approximately parallel to the external skin is attached in the vicinity of the rear edge of the mirror casing 1 on the side facing the mirror base for accommodating folding of the mirror rearwards. This hinge pin 5 is immovably arranged relative to the mirror base 3 by means of the support bracket 32. The mirror casing 1 can fold backwards about this hinge pin 5 into the pivoting position shown in FIG. 5. Stops 29 are attached to the mirror casing 1 on the side facing the mirror base and these maintain a defined position of the mirror casing 1 relative to the spindle associated with the hinge pin 5 and, by this means, determine the operating position in accordance with FIG. 1.

A front hinge pin 4 is provided with a forward offset in the direction of travel 6 relative to the rear hinge pin 5. This front hinge pin 4 is arranged so as to be relatively immovable relative to the mirror casing 1. The two hinge pins 4 and 5 are rigidly connected together by means of a connecting link 7 so that, even in a folded position, the mirror casing 1 is held onto the mirror base 3 so that is cannot be lost.

The mirror casing is clamped in the erect operating position, in accordance with the solid line showing in FIG. 1, by a clamping spring 8 located with its direction of action transverse to the two hinge pins 4 and 5. The relatively strong clamping spring 8 is hooked into a projecting bracket 30 at the mirror base end. The mirror base 3, like the mirror casing 1, is provided with a rigid streamlined fairing 9. The two fairings 9 and 11 butt flush together in the operating position of the mirror casing 1 with a relatively small gap 10.

The mirror casing 1 has a relatively straight contour in the region of the rear hinge pin 5 so that contactless pivoting of the mirror casing 1 to the rear is possible without difficulty. Since, however, the fairings 9 and 11 of the mirror base 3 and the mirror casing 1, respectively, have a complicated three-dimensional shape in the region of the gap 10—this shape being partially for flow reasons and partly for reasons of style and also because the transition region from the transition gap between the two fairing parts must be considered as given from stylistic selection criteria—it is not simply possible to position the front hinge pin 4 relative to the three-dimensional shaped gap 10 in such a way that the two fairing parts can pivot past one another without contact when the mirror casing is pivoted forwards. In previously known mirror shapes of this type, flexible fairings were therefore provided, at least in some regions. The present invention pursues another route with respect to this matter. In fact, at the beginning of the forward pivoting movement—in the pivoting region between the operating position shown in full lines and the intermediate position shown dotted in FIG. 1—the instantaneous center 16 of the pivoting motion is displaced to the outside of the casing 1. For this purpose, a rotatably supported guide part 12, in the form of a roller, is provided on the mirror casing 1 at a distance from the forward hinge pin 4 and offset in the direction towards the mirror base 3 and forwards (in the direction of travel).

Figure 4:
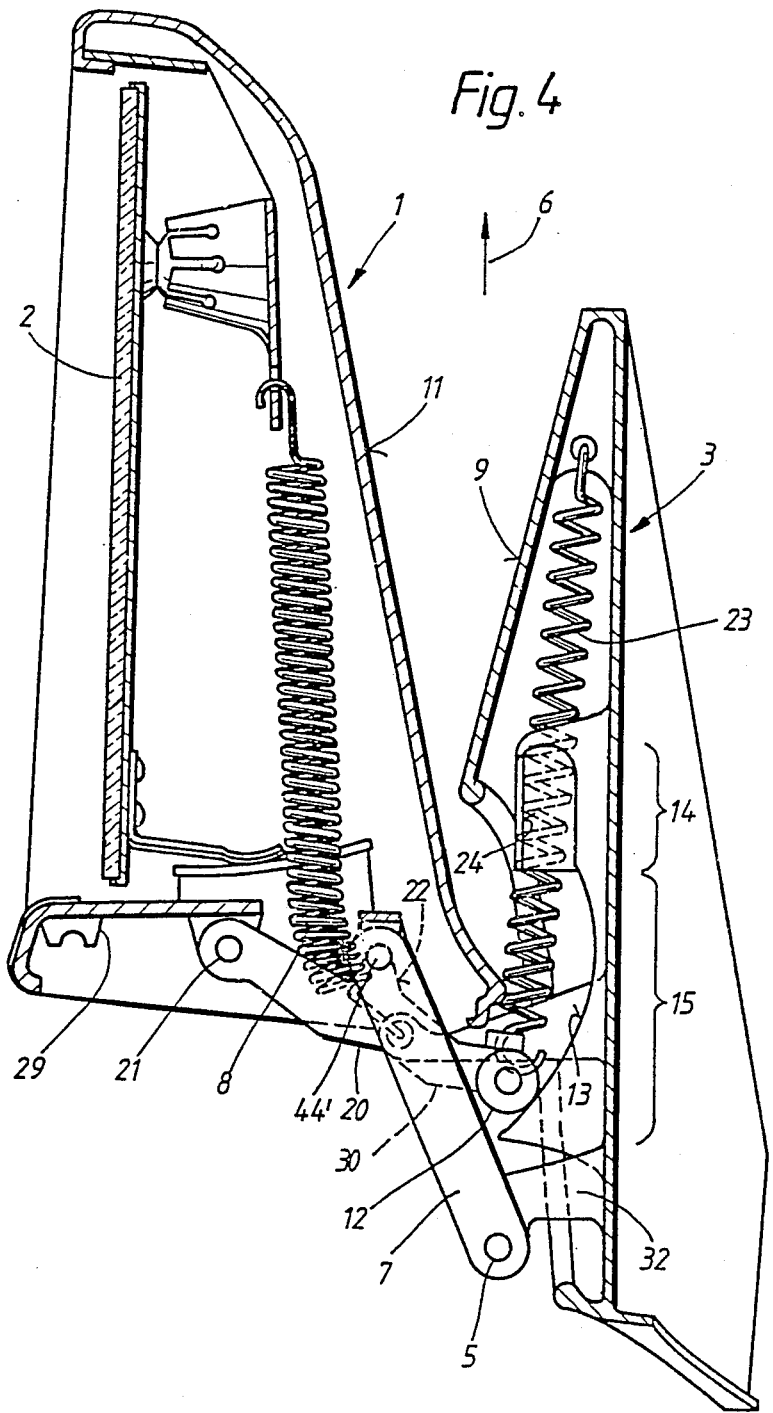
FIG. 4 is a horizontal sectional view through the external mirror arrangement of FIG. 1 with the mirror casing folded forward.

The roller shaped guide part 12 interacts with a guide track 13 located in the mirror base 3, the guide surfaces of the guide track 13 facing in the direction of the mirror casing 1. The guide part 12 is held relative to the guide track 13 and the mirror casing 1 in such a way that it is in contact with the guide track 13 in the operating position. The guide track 13 has—seen in the pivoting plane of the mirror casing of FIG. 1—a shape in the front part 14 (in the direction of travel 6) such that when the mirror casing pivots forward from the operating position, an instantaneous center 16 of the pivoting motion is produced which is located outside the fairing parts 9 and 11 but in the vicinity of the gap 10. The instantaneous center 16 of the pivoting motion is specified by the intersection point of the connecting line 19 between the two hinge pins 4 and 5 of the mirror casing and normal 18 to the guide track at part of the guide track 13 or 14. This instantaneous center 16 only applies to the very first small incremental pivoting path of the mirror casing. With a slightly altered pivoting position of the mirror casing, the instantaneous center of the pivoting motion moves sideways along the curve of the instantaneous center 17. The mirror casing is, to a certain extent, pressed outwards in the first region of the forward pivoting so that sufficient space is provided for the two abutting fairing parts 9 and 11 to pivot past one another without contact and also to be pivoted relative to one another by a very large pivoting angle without contact, as is shown in FIG. 4.

In the first part of the forward pivoting motion, the roller-shaped guide part 12 slides towards the rear on the front part 14 of the guide track. The guide part 12 is— as stated—rigidly associated with the mirror casing in this operating condition. During this initial pivoting motion of the mirror casing towards the front, the coupler 7 moves up so that the front hinge pin 4 moves away from the mirror base 3; the rear hinge pin 5 is rigidly associated with the mirror base. In the intermediate position of the mirror casing, shown chain-dotted, the front hinge pin 4 has reached the position 4'. This distance of the mirror casing away from the mirror base is sufficiently large to achieve the mutual freedom of the two fairing parts for the relative pivoting motion necessary. The rear part 15 of the guide track 13 is designed as a concentric circular arc relative to the hinge axis 4' so that, during the passage of the guide part 12 through the rear part 15 of the guide track, there is no change in the distance between the hinge pin 4 and the mirror base. In the pivoting range following on from the intermediate position shown chain-dotted, therefore, the instantaneous center of the pivoting movement has a fixed location at the position 4' of the front hinge pin. The curve of the instantaneous center 17 therefore merges into this point.

It would be intrinsically conceivable to rigidly locate the roller-shaped guide part 12 relative to the mirror casing in every direction of motion and to shape the front part 14 of the guide track to suit according to certain preferred embodiments of the invention. This does, however, assume that a guide part 12 rigidly held to the mirror casing 1 could, when pivoting to the rear, be pivoted past the gap 10 and past the fairing part 9 of the mirror base. Such a requirement leads to unfavorable compromises with respect to the arrangement and shaping of the front part 14 of the guide track in relation to the position of the gap 10 which can, in particular, lead to difficult pivoting of the mirror casing in the first part of the motion. A primary objective is, in fact, to ensure that the instantaneous center 16 is located in front of the gap 10 (in the direction of travel) at the beginning of the pivoting motion so that the abutting fairing parts at the gap 10 lift off from one another at the beginning of the pivoting motion and that the gap is increased by such a pivoting motion. For a favorable motion position and a simple straight shape of the front part 14 of the guide track, the requirement quoted above does, however, mean that in the operating position, the roller-shaped guide part 12 is located in front of the gap 10 (in the directin of travel) and cannot easily move past the edge of the fairing 9 or the gap 10 when the mirror casing is pivoted to the rear. For this reason, the roller-shaped guide part 12 is preferably attached to the outermost end of a link 20 whose other end is movable pin-jointed to the mirror casing 1 at the hinge pin 21. Stops 22 on the link 20, which interact with stops on the mirror casing side, i.e., with the spindle 31 for the front hinge pin 4, ensure that the link 20, in the operating position and in the forward pivoted position of the mirror casing, is rigidly associated with the mirror casing.

Because the link 20 can pivot in the clockwise direction relative to the mirror casing, it is however, also possible for the mirror casing to pivot rearwards despite the fact that the guide part 12 extends far forward. The guide part 12 then slides ineffectively to the rear on the guide track 13. In order to ensure that the link 20 cannot execute uncontrolled movements—also in the case of rearward pivoted positions of the mirror casing (which can under certain circumstances lead to the mirror casing pivoting back into the operating position producing undesirable collisions of the casing parts)—a return spring 23 is provided for the link 20 and this clamps the latter in the direction of travel 6 and in the direction towards the mirror base so that track contact of the guide part 12 is always ensured in the rear pivoted positions also. In this connection, the embodiment example shows a tension spring which can, however, be designed to have a relatively weak spring characteristic. A torsion spring in the region of the hinge pin 21 is also conceivable instead of a tension spring. The linkage point 21 between the link and the mirror casing is located (in the direction of travel 6) behind the front hinge pin 4 so as to provide a load-carrying base between the linkage point 21 and the hinge pin 4 for the link 20 when the link 20 is blocked for a forward pivoting motion of the mirror casing.

When pivoting back from a deflected position into the operating position, the mirror casing must reliably resume the initial position. Particularly in the case of a force acting with a substantial vertical component, the mirror casing should not be deflected downwards or upwards because this would make resumption of a satisfactory operating position more difficult. An immediate possibility for securing guidance of the mirror casing against vertically directed tipping forces is to design the coupler 7 to be very stiff in torsion. For space reasons, however, there are substantial limits due to the many parts which have to penetrate between the two hinge pins 4 and 5. In this connection, no mention has yet been made of an adjustment linkage extending from the inside of the vehicle to the rear of the mirror glass, this also having to penetrate between the two hinge pins 4 and 5. For this reason, the coupler 7 is designed as a pair of straps which have no stiffening between them so that the coupler 7 has no torsional stiffness. In order, nevertheless, to provide the mirror casing with secure guidance against vertically acting tipping forces, the guide track 13 is designed as a pair of individual tracks located parallel one above the other and at a distance apart and the link 20 is provided with corresponding width and two roller-shaped guide parts. The link 20 can itself be designed to be stiff in torsion because there are fewer other structural parts present in the range of motion of the link and extending through it. Thus the width of the link 20 and the distance apart of the two individual tracks of the guide track are themselves sufficient to achieve a certain stabilization of the mirror casing in the vertical direction when the casing folds away. In the case of a kinematically two-dimensional arrangement of the linkage of the mirror casing 1 on the mirror base, i.e., in the case of a mutually parallel position of the hinge pins 4 and 5 of the mirror casing and of the hinge pin 21 of the link, the two individual tracks of the guide track are coincident relative to one another. If the pins mentioned include an angle between them, the two individual tracks must be shaped in such a way that they lie on the outer surface of a uniform cone.

In order to still further improve the guidance mentioned of the mirror casing against vertical deflections, each of the two individual tracks is associated with one equidistant holding down track 24, whose guide surface faces toward the mirror base 3. Each holding down track is associated with another guide part 25 in the form a projecting trunnion, in the same location as the roller-shaped guide part 12, which trunnion interacts with the holding-down track 24 in such a way that the link 20, with the two parts mentioned, 12 and 25, is positively held in track contact in both directions of motion. Because of this, vertical tipping of the link relative to the mirror base is impossible; the fixed location of the hinge pin 21 relative to the mirror casing eensures that the link cannot tip relative to the mirror casing anyhow. In this manner, vertical guidance of the mirror casing is ensured by the link 20.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. External mirror for vehicles having a mirror casing, which is stationary in the operating position and in which a mirror glass is held so as to be adjustable, and having a mirror base holding the mirror casing and immovably located relative to the vehicle, also having two hinge pins located at a distance apart one behind the other in the direction of travel and approximately parallel to the external surface of the vehicle, these hinge pins being provided for the mirror casing so that the latter can, in the case of collision, move either to the front or to the rear, one of which hinge pins is located immovably with respect to the mirror base and the other relatively immovably with respect to the mirror casing, the two hinge pins being rigidly connected together by means of a coupling link, also having at least one spring acting, in its effective direction, transverse to the hinge pins and clamping the mirror casing in the operating position defined by stops on the mirror casing and/or mirror base, characterized by the combination of the following features:

the mirror base is provided with a rigid streamlined fairing which—in the operating position of the mirror casing - merges flush with a gap in a streamline fairing of the mirror casing;

the hinge pin with fixed location relative to the mirror base is located to the rear with respect to the direction of vehicle travel and the other hinge pin, arranged to be relatively immobile with respect to the mirror casing is located at the front with respect to the direction of travel vehicle;

a pivotably or rotatably held guide part is provided on the mirror casing at a distance from the front hinge pin and in the direction towards the mirror base and/or offset relative to it towards the front, which guide part interacts with guide track located in the mirror base, the guide surface of which guide track points in the direction of the mirror casing and is in contact with the guide part at least in the operating position of the mirror casing; and the guide track has—seen in the plane of pivoting of the mirror casing—at least in a front part, a shape such that when the mirror casing pivots out of the operating position in the forward direction, the instantaneous center of the pivoting motion represented by the current intersection point of the connecting line between the two hinge pins of the mirror casing with the guide track normal at the kinematically effective contact point of the guide part, is always located outside the fairing parts but in the vicinity of the gap.

2. External mirror according to claim 1, wherein the foremost part of the guide track is located and shaped in such a way and the guide part—in the operating position of the mirror casing—is located in such a way with respect to the guide track that, at least at the beginning of the pivoting motion of the mirror casing out of the operating position towards the front, the instantaneous center of the pivoting motion is located in front of the gap.

3. External mirror according to claim 2, wherein the guide part is attached at the outermost end of a link which is, in turn, pin-jointed at its other end to the mirror casing on the side facing the mirror base in wuch a way that it is pivotable independently of the connecting link in approximately the same plane as the latter but the link—at least in the operating position of the mirror casing—is in contact with a stop of the latter in such a way as to block an approach of the guide parts towards the mirror casing.

4. External mirror according to claim 3, wherein the guide part of the link and the foremost part of the guide track are located in front of the gap in the operating position of the mirror casing.

5. External mirror according to claim 1, wherein the foremost part of the guide track is straight.

6. External mirror according to claim 1, wherein the rear part of the guide track has a circular arc shape.

7. External mirror according to claim 6, wherein the circular arc shaped part of the guide track is designed to be concentric to the front hinge pin in the position in which it finds itself when the mirror casing is pivoted forwards.

8. External mirror according to claim 1, wherein the guide part of the link is a roller.

9. External mirror according to claim 1, wherein the link is provided with a return spring which clamps the link in the direction of travel or in the direction towards the mirror base.

10. External mirror according to claim 1, wherein the linkage point of the link on the mirror casing is located behind the front hinge pin.

11. External mirror according to claim 3, wherein the guide track is designed as a pair of two individual tracks arranged at a distance apart, and parallel one above the other and that the link is provided with a corresponding width and with two guide parts configured as rollers.

12. External mirror according to claim 11, wherein the two hinge pins of the mirror casing and those of the link are located parallel to one another and the two individual tracks seen in the direction of the hinge pins - are designed to be coincident.

13. External mirror according to claim 12, wherein each of the two individual tracks is associated with one equidistant holding-down track whose guide surface faces towards the mirror base and which interacts with the guide part, or another guide part located in the same position, of the link in such a way that the link is positively held in track contact with the guide parts.

14. External mirror arrangement for vehicles, comprising:

mirror casing means for holding a mirror, said casing means exhibiting a rigid exterior streamlined casing fairing facing away from the mirror;

mirror base means for supporting the casing means at a vehicle body structure, said mirror base means exhibiting a rigid exterior streamlined casing fairing; and securing means for securing the casing means in an operative position on the base means with the casing fairing substantially merging with the base fairing along a connecting gap, said securing means including pivot coupling means permitting collision force responsive pivotal movement of the casing means with respect to the base means and resilient restoring force means for resiliently resisting the movement of the casing means away from the operative position, wherein said coupling means includes pivot pin means at the casing means and the base means and guide means for guiding the movement of the casing means in such a manner that the casing means pivots about a pivot center located outside the fairings and forward of the connecting gap during initial pivoting movement responsive to forward forces on the casing means, whereby pivotal movement of the rigid casing fairing past the rigid base fairing at the connection gap is accommodated.

15. An arrangement according to claim 14, wherein said pivot pin means includes:

casing pivot pin means carried by the casing means; and base pivot pin means attached to the base means, and wherein coupling link means rigidly connect the casing pivot pin means to the base pivot pin means.

16. An arrangement according to claim 15, wherein said guide means includes interengageable guide part means and guide track means provided at the casing means and base means.

17. An arrangement according to claim 16, wherein said guide track means is fixedly disposed at the base means, and wherein said guide part means is a roller carried on a guide link, said guide link being pivotally attached to the casing means for pivotal movement independently of the coupling link means.

18. An arrangement according to claim 15, wherein said resilient restoring force means includes coil spring means acting transverse to the pivot pin means.

19. An arrangement according to claim 17, further comprising spring means and link guide track means for controlling the movement of the guide link during rearward pivoting of the casing means.

20. An arrangement according to claim 14, wherein said guide means is configured to effect lifting of the casing means from the base means during initial forward movement of the casing means, followed by pivoting movement of the casing means about a fixed pivot point.

* * * * *